United States Patent
Bonjour et al.

(10) Patent No.: US 8,331,868 B2
(45) Date of Patent: Dec. 11, 2012

(54) METHOD AND SYSTEM OF POWER MANAGEMENT FOR ELECTRONIC DEVICES

(75) Inventors: Fabien Bonjour, Le Cres (FR); Adam Molnar, Mauguio (FR)

(73) Assignee: Coronis SAS, Perols (FR)

( * ) Notice: Subject to any disclaimer, the term of this patent is extended or adjusted under 35 U.S.C. 154(b) by 117 days.

(21) Appl. No.: 13/004,306

(22) Filed: Jan. 11, 2011

(65) Prior Publication Data

US 2011/0237201 A1   Sep. 29, 2011

(30) Foreign Application Priority Data

Jan. 11, 2010   (EP) ..................................... 10000163

(51) Int. Cl.
*H04B 17/00*   (2006.01)
(52) U.S. Cl. ............... 455/67.11; 455/127.1; 455/343.5; 455/574
(58) Field of Classification Search ............... 455/67.11, 455/67.14, 127.1, 127.5, 255–260, 343.1, 455/343.2, 343.5, 572, 574
See application file for complete search history.

(56) References Cited

U.S. PATENT DOCUMENTS

| | | | |
|---|---|---|---|
| 5,574,979 A * | 11/1996 | West | 455/63.1 |
| 6,208,837 B1 | 3/2001 | Koh et al. | |
| 6,463,266 B1 | 10/2002 | Shohara | |
| 6,987,955 B1 * | 1/2006 | Sapozhnykov et al. | 455/127.5 |
| 7,072,697 B2 * | 7/2006 | Lappetelainen et al. | 455/574 |
| 7,461,346 B2 | 12/2008 | Fildebrandt | |
| 7,512,423 B2 | 3/2009 | Karaoguz | |
| 7,532,868 B1 * | 5/2009 | Sapozhnykov et al. | 455/127.1 |
| 7,613,484 B2 * | 11/2009 | Lappetel inen et al. | 455/574 |
| 2008/0292031 A1 | 11/2008 | Sibers | |

FOREIGN PATENT DOCUMENTS

| | | |
|---|---|---|
| FR | 2836308 | 8/2003 |
| WO | WO 97/38489 | 10/1997 |
| WO | WO 98/35544 | 8/1998 |
| WO | WO 02/07387 | 1/2002 |
| WO | WO 2009/095869 | 8/2009 |

* cited by examiner

*Primary Examiner* — Nhan Le
(74) *Attorney, Agent, or Firm* — Harness, Dickey & Pierce, P.L.C.

(57) ABSTRACT

A method of power management of an electronic device, the method including the steps of: sending periodically at least one signal by the microcontroller to a radio equipment in order to control an incoming radio frequency transmission after an inactivity time of the radio equipment, returning in standby mode of the microcontroller, initiating by the radio equipment of a power up sequence, powering up one by one the different functional blocks of the radio equipment, determining of a measurement of a received power of the incoming radio frequency transmission once a RSSI detection functional block is powered and determining a state mode of power consumption to apply to all the functional blocks of the radio equipment and the microcontroller functions of the comparison of the measurement to a reference threshold.

15 Claims, 5 Drawing Sheets

METHOD AND SYSTEM OF POWER MANAGEMENT FOR ELECTRONIC DEVICES

CROSS-REFERENCE TO RELATED APPLICATIONS

This application claims the benefit and priority of European Patent Application Serial No. 1000063.5, filed on Jan. 11, 2010, which is incorporated by reference herein.

FIELD OF THE INVENTION

The present invention refers to a method and a system of power management for electronic devices, to extend battery life. The invention also relates to the field of telecommunications, and more specifically, to the field of power control in wireless communicating equipments in which low power constraints are required.

BACKGROUND

Conventional wireless communicating equipments are powered by rechargeable batteries or primary batteries. The operational life of wireless equipment between battery charges is directly dependent on the charge life battery. In addition, the charge life battery is related to battery size, which is a major factor in determining the equipment's physical and operational characteristics, i.e. size, weight, and operational life span.

Today, wireless equipments are currently used in some industrial or mass deployment applications, for commercial, maintenance or logistic reasons. In these circumstances, but not exclusively, a recurrent problem is usually encountered by the wireless equipments industry to search for ways to extend the battery life before recharging is required, and consequently lower the power consumption of the wireless equipment.

In many communication systems, the wireless communication equipment, such as a cellular phone, PDA (personal digital assistant), etc. . . . , are only randomly active. Indeed, this kind of equipment remains idle for significant periods of time when no call is in progress. And during such idle periods the equipment consumes substantially the same amount of power as during active periods. However to ensure that the transceiver of this equipment receives randomly transmitted messages, it must continuously monitor a channel of communication. The equipment may consume significant of power by continuously monitoring the channel for incoming messages. The resulting power drain on the battery reduces the time available for actively handling calls.

In order to overcome these problems, a system is known in the prior art and relates in the document US 2004/0029620 permitting to save power in a radio receiver. In this system, a control module of a radio equipment like for example a radio receiver or a radio transceiver evaluates whether an element of this radio receiver may be powered down, or when it should be brought back up. This control module comprises means to determine a power cycle time in order to power back or power down at least one element of the radio transceiver. Thus, this control element serves to intelligently manage power consumption on an element-by-element basis.

However, such a kind of system has some limitations because it does not comprise set up possibilities, and feedback information concerning the communication reliability.

These problems and deficiencies are clearly felt in the art and are solved by the present invention in the manner described below.

SUMMARY

The present invention aims at solving this problem related to the maximization of battery life base on a method which improves power management functionality of a wireless equipment based on an integration in an RF transceiver silicon of a state machine automat which is managing the timing for supplying of the different blocks, associated with a computer processing in order to adjust the timing sequence, regarding the RF characteristics.

More specifically, the subject-matter of the invention relates to a method of power management of an electronic device comprising the steps of:

sending periodically at least one signal by the microcontroller to a radio equipment in order to control an incoming radio frequency transmission after an inactivity time of the radio equipment, returning in standby mode of the microcontroller, initiating by the radio equipment of a power up sequence, powering up one by one the different functional blocks of the radio equipment, and executing a measurement of a received power of the incoming radio frequency transmission once a RSSI detection functional block is powered, determining an appropriate mode, between a stand-by mode and an active mode, relative to power consumption to apply to all the functional blocks of the radio equipment and the microcontroller comparing said measurement to a reference threshold.

An advantage of the invention is to power up all the functional blocks once by once progressively, in function of the use, instead of starting them at the same time in order to reduce the power consumption, because each of these blocks has different setup times and does not need to be powered on at the same time.

According to particular embodiments:

the step of determining the appropriate mode comprises a step of changing the microcontroller mode to the active mode if the measurement is greater than the reference threshold;

the step of determining the appropriate mode comprises a step of changing the mode of all the functional blocks of the radio equipment to the standby mode if the measurement is smaller than the reference threshold;

the microcontroller returns to the active mode when it receives a signal from the RSSI detection block;

the measurement is greater than the reference threshold when an incoming radio frequency is detected;

the different functional blocks are powered up in the order as following:

a oscillator block, a bias block, a synthesizer block, a receiver chain, and the RSSI detection block;

the step of initiating comprises the steps of:

starting an oscillation circuit internal to the radio equipment, and creating the oscillation circuit initialisation on an external quartz crystal component in order to generate a clock frequency.

The invention is also referred to a power management device in a apparatus comprising process means which contains processing algorithms and a radio equipment, the said radio equipment comprising an integrated circuit operating in different frequency range and different functional blocks having the possibility to be powered up separately, and wherein the radio equipment is associated and driven by the microcontroller in order to determine a state mode of power consumption according to the method.

According to particular embodiments:

one of the different functional blocks corresponds to an oscillator;

one of the different functional blocks corresponds to a bias;

one of the different functional blocks corresponds to a synthesizer;

the radio equipment is a radio receiver or a radio transceiver;

the process means are a microcontroller, and the process means are a digital block.

BRIEF DESCRIPTION OF THE DRAWINGS

Embodiments of the invention will now be described by way of example only with reference to the accompanying drawings in which.

DETAILED DESCRIPTION OF THE PREFERRED EMBODIMENTS

Figure 1:
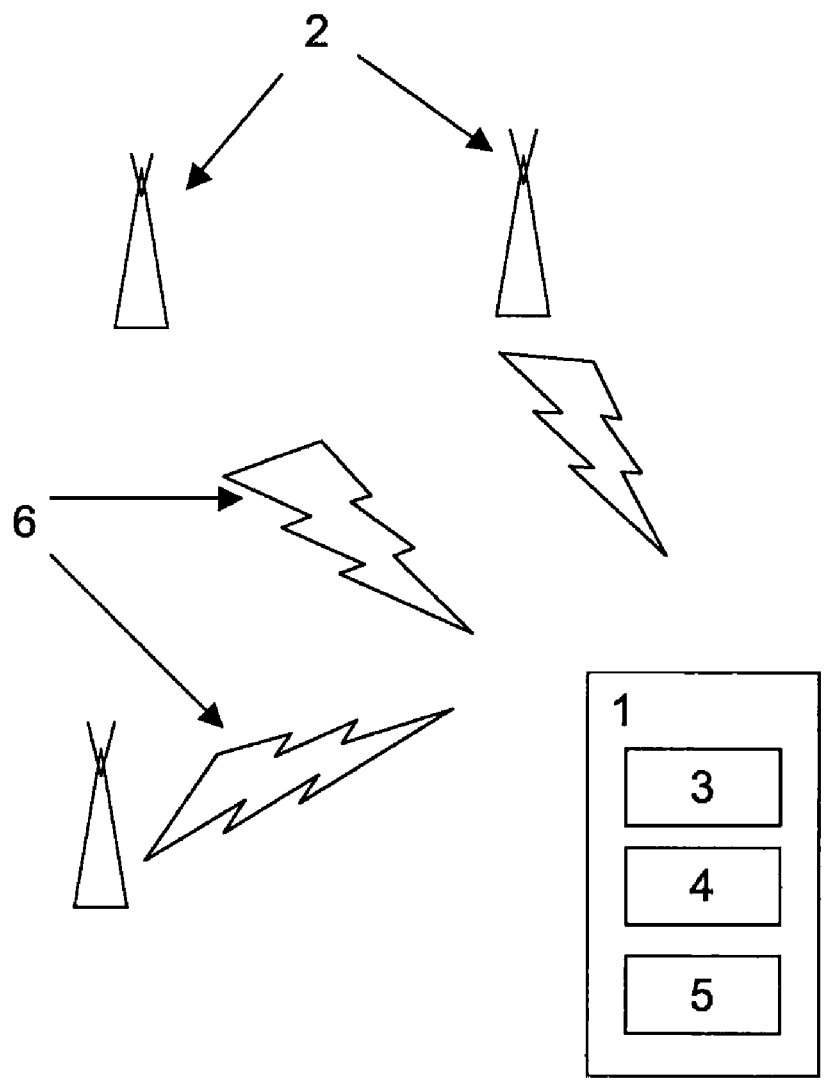
FIG. 1, is illustrating a communication system according to one embodiment of the invention.

Referring now to the drawings, wherein like reference numerals designate identical or corresponding parts throughout the several views, preferred embodiments of the invention are described. FIG. 1 illustrating an example of wireless communication equipment 1 in which the invention may be implemented. This wireless communication equipment 1 is a part of a communication system that includes another wireless communication equipments and base stations 2 or access points. This wireless communication equipment 1 may be a cellular telephone, personal computers, hand held or laptop devices.

Figure 2:
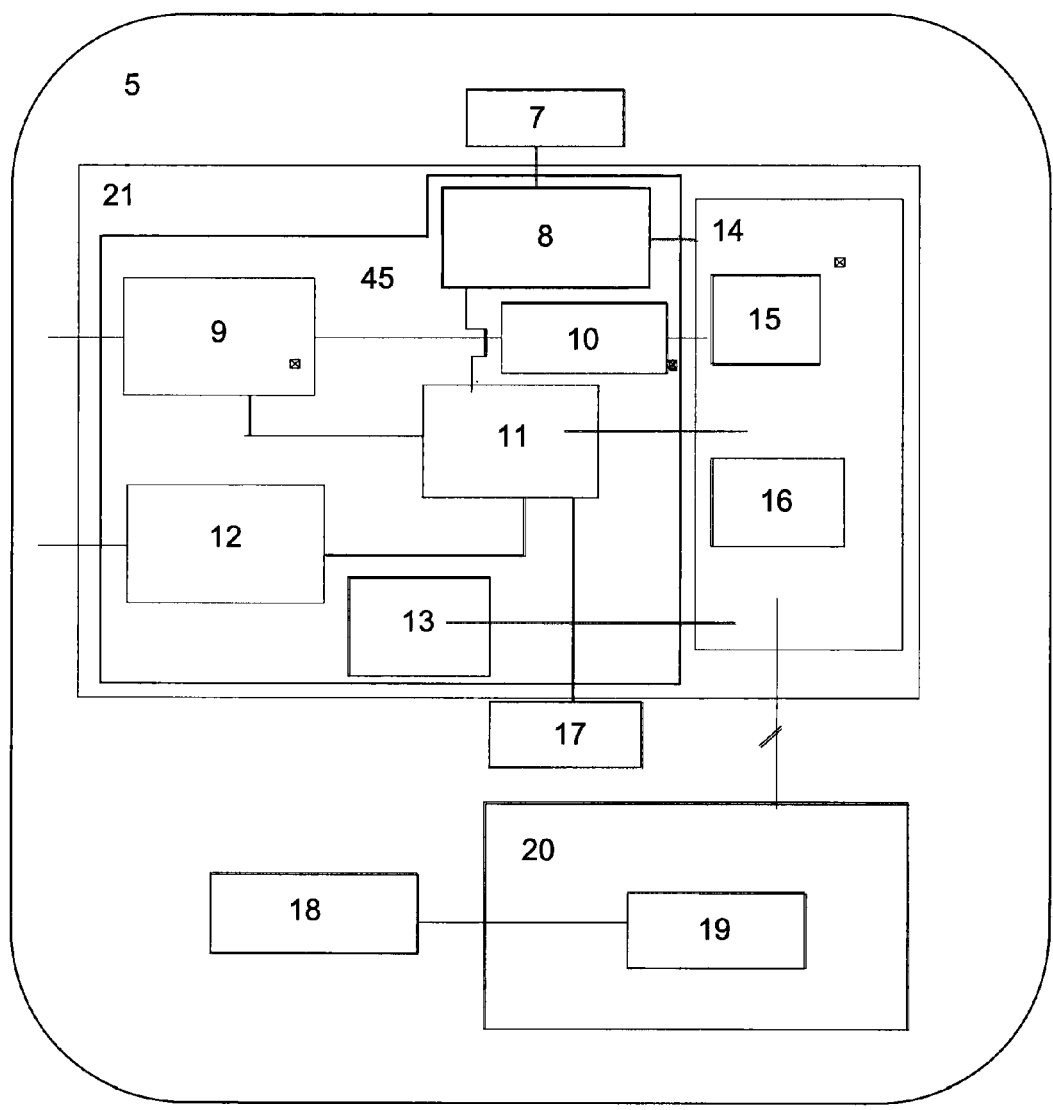
FIG. 2, is a schematic bloc diagram of a power management system in accordance with the present invention.

Each base stations 2 or access points have a wireless connection or transceiver (e.g., an antenna) and may operate according to various wireless standards to communicate with the wireless communication equipment 1. The wireless communication equipment comprises notably processing means 3, a system power management 4 and a battery 5. The system power management 4 is illustrated in the FIG. 2. This system power management comprises two main components:

a radio equipment like for example a radio transceiver or a radio receiver 21 (or radio-frequency Application-Specific Integrated Circuit, ASIC), and a microcontroller 20.

In manner non-restrictive, in this embodiment, we consider that the radio equipment is radio transceiver. The radio-frequency ASIC consists of two main parts: an analog part 45 and a digital part 14.

The analog part 45 comprises:

a receiver front end block 9 comprises a LNA (low noise amplifier) which allows the first amplification of the received signal and limit the noise adding by the receiver, and a mixer which allows the down conversion to an intermediary frequency of few hundred of khz (kilohertz);

an oscillator block 8 which allows the generation of a reference frequency for the RF frequency synthesis and for the clock used by the digital part. The oscillator bloc is the active part of the oscillator. The passive part is the Crystal (block 7);

a transmitter PA block 12 which allows the amplification of the transmitted signal;

a synthesiser PLL block 11 which allows the synthesis of the frequency used by the receiver and the transmitter. The PLL bloc is the main part of the PLL. The external loop filter (block 17) is also a part of the PLL;

a bias block 13 which allows the generation of the bias current (reference) for the Asic;

a sigma delta block 10 is a Sigma Delta ADC (Analog to digital converter) which allows the digitalization of the down converted signal and the rejection of the noise.

The receiver front end 9 comprises means of connection with the sigma delta block 10 and the synthesiser PLL block 11. The received signal is amplified and down converted by the front end block. The PLL supply the local oscillator frequency used for the mixer. At the output of the mixer the down converted signal is filtered and digitalized by the sigma delta ADC. The transmitter PA block 12 comprises means of connection with the synthesiser PLL block 11. The PLL is directly modulated to supply the transmitted signal.

The oscillator block 8 comprises means of connection with a crystal 7 and the digital part 14. The oscillator bloc is connected to the crystal because it is the active part of the oscillator—the crystal is the passive part. The output of the oscillator is connected to the PLL (reference frequency of the PLL) and to the digital part (clock). The synthesiser PLL block 11 comprises means of connection with a loop filter 17. The loop filter is a passive part of the PLL. It is external to the Asic to allow different loop filter for different data rate.

The radio frequency signal 6 received by the receiver front end block 9 is down-converted at a low frequency to an intermediary frequency, in general few hundred kilohertz. Then this signal is filtered and converted to a digital signal in order to be transmitted to the digital part 14. This digital part 14 comprises a RSSI (Received Signal Strength Indication) detection functional block 15 and a state machine 16.

The RSSI detection functional block 15 is able to establish a measurement of the power present in a received radio signal transmitted by the receiver front end block 9. This RSSI detection functional block 15 is often done in the intermediate frequency (IF) stage before the IF amplifier. In zero-IF systems, it is done in the baseband signal chain, before the baseband amplifier. RSSI output is often a DC analog level. In this embodiment, the low IF, RSSI is done by the digital part. It can also be sampled by an internal ADC and the resulting codes available directly or via peripheral or internal processor bus. The RSSI is used internally in the wireless communicating equipment 1 to determine when the amount of radio energy in the channel is below a certain threshold.

The state machine 16 is a logic block. This block is a coded logic which allows to execute automatically the algorithm of the autopower up sequence. The state machine is control by the microcontroller but is independent.

The microcontroller 20 comprises, notably, the following features:

a 8-bit processor single;

discrete input and output bits, allowing control or detection of the logic state of an individual package pin;

serial input/output such as serial ports (UARTs);

other serial communications interfaces like I²C, Serial Peripheral Interface and Controller Area Network for system interconnect;

peripherals such as timers, event counters, PWM generators, and watchdog;

volatile memory (RAM) for data storage;

ROM, EPROM, EEPROM or Flash memory for program and operating parameter storage;

a timer 19;

analog-to-digital converters, and in-circuit programming and debugging support.

In another embodiment, the task of the microcontroller can be done by a digital block.

The timer 19 comprises means of connection with a quartz timing crystal 18, which has a frequency of 32 kHz. This frequency is used to keep track of time, and to provide a stable clock signal. The microcontroller 20 is linked with the digital part of the radio transceiver 21 with an BUS interface.

Figure 3:
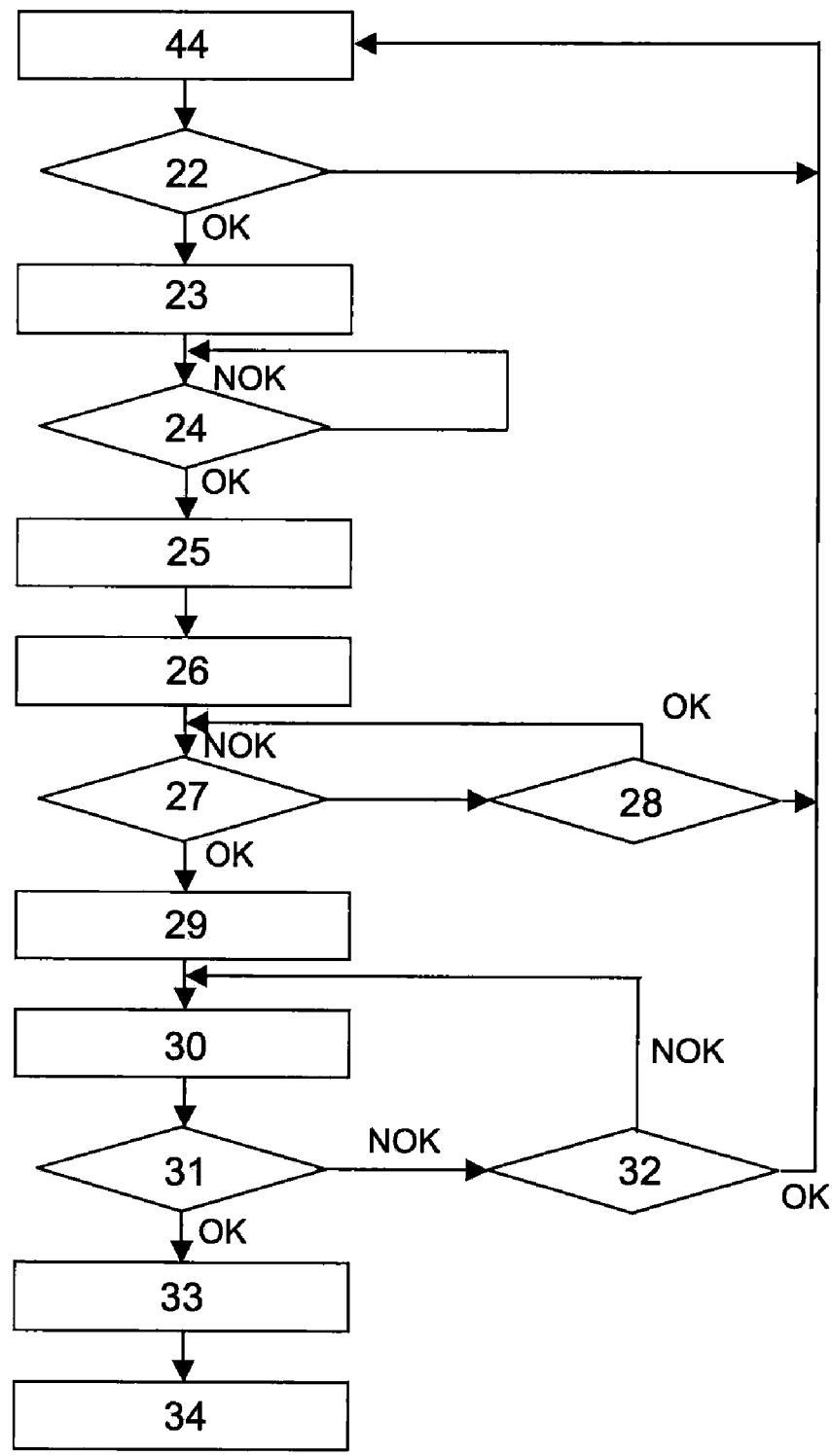
FIG. 3, is a flow chart illustrating the automatic power up sequences of the state machine automat according to one embodiment of the invention.
Figure 4:
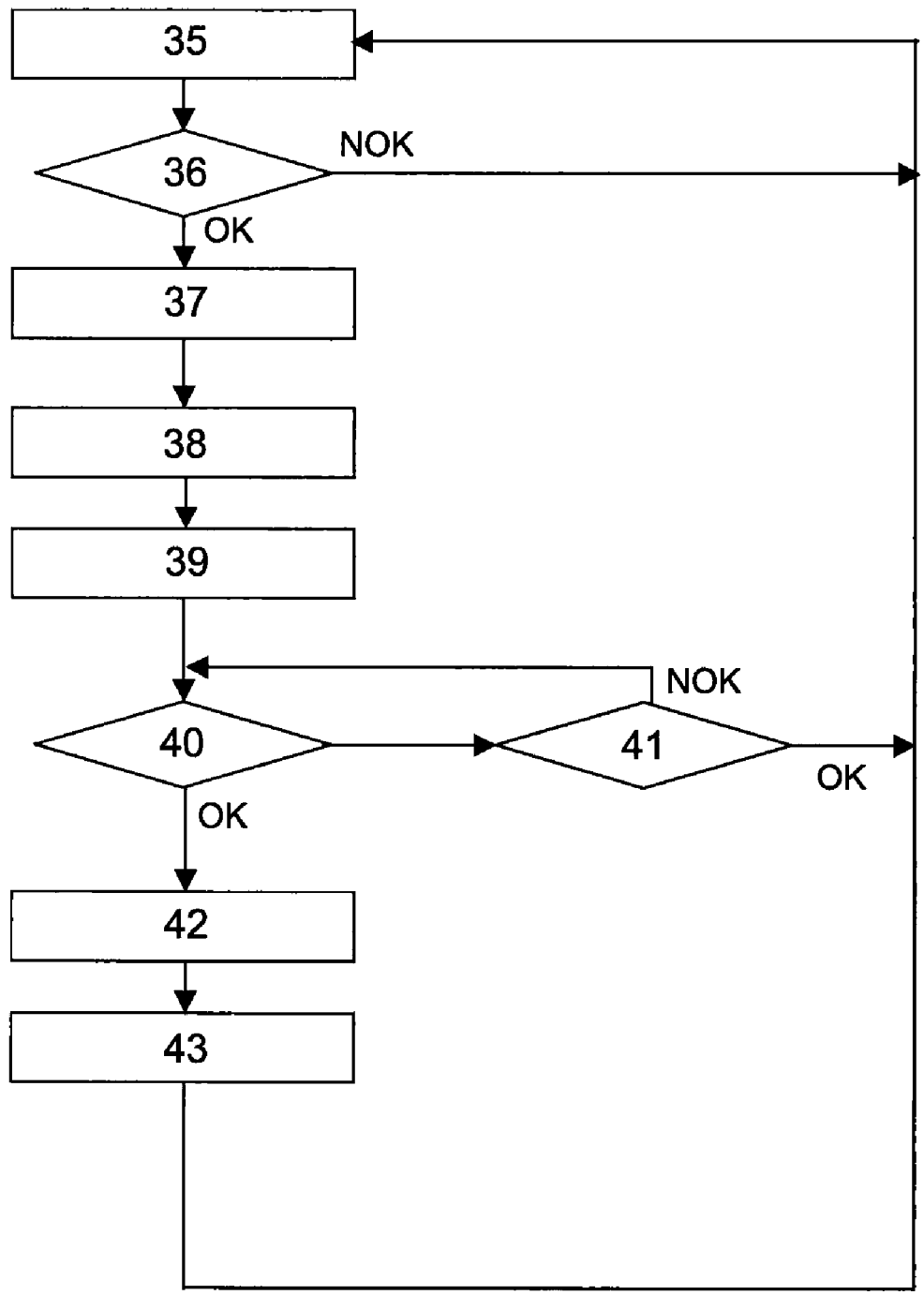
FIG. 4, is a flow chart illustrating the mechanism of the microcontroller.

Referring to the FIGS. 3 and 4, the state machine 16 controls the different steps of the automatic power up sequence. The system power management 5 is structured around several blocks which have different setup times and which do not need to be powered on at the same time, and all together at the same moment. The oscillator 8 set up time is longer than the low noise amplifier (LNA), so the LNA has to be switched on after the oscillator. The LNA is a special type of electronic amplifier or amplifier used in communication systems to amplify very weak signals captured by an antenna.

The state of machine 16 automatically manages the timing for the supply of different blocks. All blocks; oscillator 8, bias 13, synthesiser PLL 11, Receiver chain 9 and 10, RSSI 15; are started and powered once by once, progressively, depending on the usage. The microcontroller 20 contains processing algorithms, which control parameters in order to adjust the timing sequence, regarding the radio transceiver 21 characteristics.

In the context of the present invention, the system power management 5 allows the receiver front end block 9 to check the radio frequency medium every 1 second with an average consumption about 10 µA, which is compliant with ten or fifteen years of life duration required by lots of applications. The microcontroller 20 initiates a periodic radio transceiver wake up. After a step in which the microcontroller 20 is in a sleep mode 35. The microcontroller 20 sends periodically at least one signal to a radio transceiver 21 in order to control an incoming radio frequency transmission after an inactivity time of the radio transceiver 21.

The cycle of the periodic activation is controlled by the timer. Indeed, after each cycle the timer is re-initialized in the step 37. The microcontroller 20 leave the sleep mode 35, if the time calculated by the timer 19 is greater than a period of wake up previously defined, step 36. If it is the case, the timer is re-initialized in the step 37 and an interrupt signal is sent to the radio transceiver 21, step 38. In the contrary case, the microcontroller 20 stays in a sleep mode configuration, in the step 35.

The microcontroller returns in sleep mode, step 39 and wait a interrupt signal of the transceiver, step 40. The interrupt signal is wait for a certain time. This control is done at the step 41. Then the radio transceiver 21 turns on the crystal oscillator at step 23. At the step 22, the transceiver check the interrupt signal of the microcontroller sent at the step 38.

The crystal oscillator need time to start up. The oscillator is considered running if its output signal has a enough level to clocked the state machine. 2 way exists to be sure that the signal is enough: 1/wait a delay 2/pull the level of the output of the crystal oscillator, at the step 24. The second one is here used because it allows to optimise start up time. Then the bias circuit block is turned on as the synthesiser PLL at respectively step 25 and 26.

The step 27, a lock detector is used internally in the Asic to know when the PLL is locked (or when the expected frequency is available—with a given accuracy). To avoid an infinite loop, in case the PLL never lock, a programming delay "time out" is controlled by the block 28. If the PLL doesn't locked during the "time out" time, the receiver return to stand by mode 44. If the PLL locked in the "time out" delay, all the rest of the receiver (Rx) is turn on (front end, filter, ADC, digital part), at the step 29.

The radio transceiver performs a RSSI measurement based on the RSSI detection functional block at step 30, and checks at step 31 the RSSI level value with a threshold. If the RSSI level value is smaller than the threshold the radio transceiver returns in a stand by mode at step 44, the RSSI measurement, step 30, and the check with the threshold, step 31, is repeat during a programming duration. The control of this loop is done at the step 32, where the time spent since the first measurement is compared with the programming value. If the time is lower, the RSSI, step 30, is again measured. If not, the transceiver go back to the stand by mode step 35. Otherwise, the radio transceiver sends an interrupt signal to the microcontroller 20 at step 33, because a radio frequency signal 6 has been detected by the radio transceiver 21 which needed to stay in a full reception mode at step 34.

The measurement performed by the RSSI detection block 15 is greater than the reference threshold when an incoming radio frequency is detected. When the microcontroller 20 received the interrupt signal send by the RSSI functional block at step 40, it leaves the sleep mode (step 42).

In order to guarantee global low power consumption, the microcontroller 20 must have the capability to pass from the sleep mode to the active mode very quickly, just about few microseconds. This can be obtained with a microcontroller 20 which manages the internal clock based on a synthesiser PLL and a low power 32 kHz oscillator. It is not always necessary because a PLL, a RC or other oscillator can be used, in another embodiment.

Once the microcontroller 20 is in the active mode, it processes the data received by the receiver front end block 9, in a step 43. The microcontroller 20 returns in a sleep mode at the step 35 and a new cycle will start again according to the parameter of wake up period. The state mode of all the functional blocks of the radio transceiver 21 changes to a standby mode if the measurement performed by the RSSI functional block 15 is smaller than the reference threshold.

Figure 5:
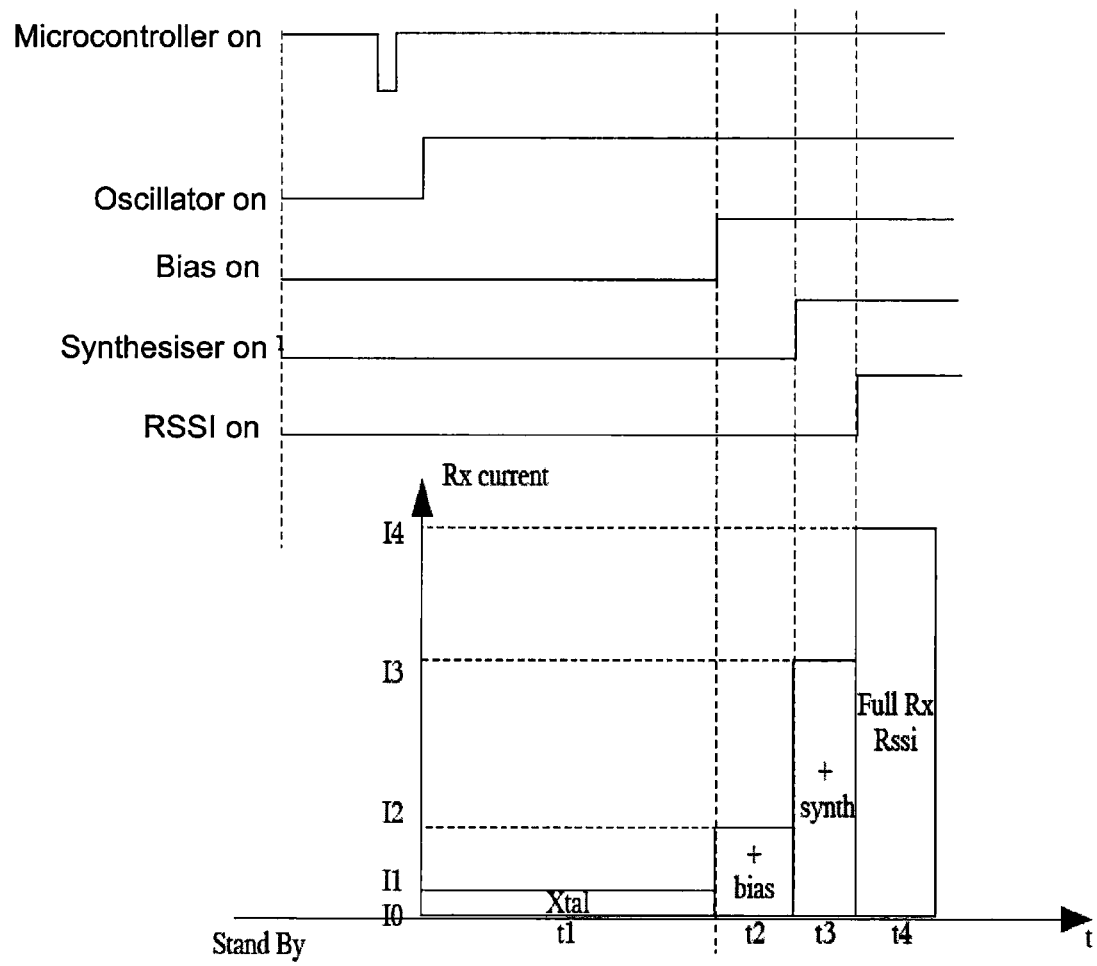
FIG. 5, is illustrating one embodiment of the invention.

The FIG. 5 is illustrating the average consumption of the wireless communicating equipment reached. The period of scanning the reception of a radio frequency signal 6 corresponding to one complete cycle when no radio frequency signal 6 has not been detected is 1 second.

The average current and so the autonomy of the wireless communication equipment 1 depends on the autopowerup sequence and is determinate based on the values of the different currents:

I0 stand by current;

I1 of the oscillator 8 during the period t1 of activation;

I2 of the bias 13 during the period t2 of activation;

I3 of the synthesiser PLL 11 during the period t3 of activation, and

I4 of the receiver chain and RSSI detection functional block 15 during the period t4 of activation.

All these values are recorded in the table 1 below:

TABLE 1

| Time (us) | | | | Current (mA) | | | | | Average current | | Autonomy |
| --- | --- | --- | --- | --- | --- | --- | --- | --- | --- | --- | --- |
| t1 | t2 | t3 | t4 | I0 | I1 | I2 | I3 | I4 | I avg rf | L regul + µ | I tot avg | Year |
| 3000 | 150 | 250 | 500 | 0.0005 | 0.1 | 0.25 | 11 | 15 | 11.1 | 2.5 | 13.6 | 17.1 |
| 3000 | 150 | 250 | 500 | 0.0005 | 0.1 | 0.25 | 11 | 17 | 12.1 | 2.5 | 14.6 | 16.0 |
| 3000 | 150 | 250 | 500 | 0.0005 | 0.1 | 0.25 | 11 | 20 | 13.6 | 2.5 | 16.1 | 14.5 |
| 3000 | 150 | 250 | 500 | 0.0005 | 0.1 | 0.25 | 11 | 17 | 12.1 | 2.5 | 14.6 | 16.0 |

The average current is calculated based on:

$$I_{avg} = I0 + (I1 \cdot t1 + I2 \cdot t2 + I3 \cdot t3 + I4 \cdot t4)/T,$$

with T corresponding to the scanning time, and $I_{avg}$ the average current.

In the table 2 below, the contribution of each phase in regard of the current received corresponds to the followings results:

TABLE 2

| | Phase | | | | | |
| --- | --- | --- | --- | --- | --- | --- |
| | 0 Stand by | 1 Xtal | 2 Bias | 3 Synth | 4 Rx | total |
| 1 avg | 3 | 0.3 | 0.0375 | 2.75 | 8.5 | 14.6 |
| % | 20.5 | 2.1 | 0.3 | 18.8 | 58.2 | 100.0 |

The obtained average current $I_{avg}$ with 1 second pulling is roughly 14.6 µA. The system power management 5 can be implemented in wireless communication equipments dedicated for ultra low power applications.

As a further aspect of the present invention is to be used in applications where the wireless communication equipment with low power constraints are required, specially for battery powered devices, for examples in domains like:
  automatic meters reading systems;
  alarm peripheral;
  home automation remote devices;
  medical and healthcare battery powered devices, and
  active RFID (radio frequency identification) tags.
The wireless communication system is only an example of suitable communication system and is not intended to suggest any limitation as to the scope of use or functionality of the invention. Neither should the wireless communication system be interpreted as having any dependency or requirement relating to any combination of components illustrated in the exemplary wireless communication system.

The invention claimed is:

1. A method of power management of an electronic device, the method comprising:
  sending periodically at least one signal by a microcontroller to a radio equipment in order to control an incoming radio frequency transmission after an inactivity time of the radio equipment;
  returning in standby mode of the microcontroller;
  initiating a power up sequence by the radio equipment;
  powering up one by one different functional blocks of the radio equipment;
  determining of a measurement of a received power of the incoming radio frequency transmission once a RSSI detection functional block is powered; and
  determining a state mode of power consumption to apply to all the functional blocks of the radio equipment and the microcontroller functions of a comparison of a measurement to a reference threshold.

2. The method according to claim 1, wherein the step of determining comprises a step of changing the state mode of the microcontroller to an active mode if the measurement is greater than the reference threshold.

3. The method according to claim 1, wherein the step of determining comprises a step of changing the state mode of all the functional blocks of the radio equipment to a standby mode if the measurement is smaller than the reference threshold.

4. The method according to claim 1, wherein the microcontroller returns in active mode when it receives a signal from the RSSI detection block.

5. The method according to claim 1, wherein the measurement is greater than the reference threshold when an incoming radio frequency is detected.

6. The method according to claim 1, wherein the different functional blocks are powered up in the order as following:
  first an oscillator block;
  second a bias block;
  third a synthesiser block; and
  fourth the reception chain and the RSSI detection block.

7. The method according to claim 1, wherein the step of initiating comprises:
  starting an oscillation circuit internal to the radio equipment; and
  creating an oscillation circuit condition on an external quartz crystal component in order to generate a clock frequency.

8. The method according to claim 1, wherein the radio equipment is one of: a radio receiver and a radio transceiver.

9. A power management device of an electronic apparatus comprising a processor which contains processing algorithms, and a radio comprising an integrated circuit operating in different frequency ranges and different functional blocks having the possibility to be powered up separately, wherein the radio is associated and driven by the processor in order to determine a state mode of power consumption by:
  sending periodically at least one signal by the processor to the radio in order to control an incoming radio frequency transmission after an inactivity time of the radio;
  returning in standby mode of the processor;
  initiating a power up sequence by the radio;
  powering up one by one different functional blocks of the radio;
  determining of a measurement of a received power of the incoming radio frequency transmission once a RSSI detection functional block is powered; and
  determining a state mode of the power consumption to apply to all the functional blocks of the radio and the processor functions of a comparison of a measurement to a reference threshold.

10. The power management device of an electronic apparatus according to claim 9, wherein one of the different functional blocks corresponds to an oscillator.

11. The power management device of an electronic apparatus according to claim 9, wherein one of the different functional blocks corresponds to a bias.

12. The power management device of an electronic apparatus according to claim 9, wherein one of the different functional blocks corresponds to a synthesiser.

13. The power management device of an electronic apparatus according to claim 9, wherein the processer is a microcontroller.

14. The power management device of an electronic apparatus according to claim 9, wherein the processer includes a digital block.

15. The power management device of an electronic apparatus according to claim 9, wherein the radio includes one of: a radio receiver and a radio transceiver.

* * * * *

UNITED STATES PATENT AND TRADEMARK OFFICE
CERTIFICATE OF CORRECTION

| | | |
|---|---|---|
| PATENT NO. | : 8,331,868 B2 | Page 1 of 1 |
| APPLICATION NO. | : 13/004306 | |
| DATED | : December 11, 2012 | |
| INVENTOR(S) | : Bonjour et al. | |

It is certified that error appears in the above-identified patent and that said Letters Patent is hereby corrected as shown below:

On the title page item [73], delete "Coronis SAS, Perols" and insert therefor:
-- Elster, Lognes --.

Signed and Sealed this
Fifth Day of April, 2016

Michelle K. Lee
*Director of the United States Patent and Trademark Office*